US008525388B2

(12) United States Patent
Araki (10) Patent No.: US 8,525,388 B2
(45) Date of Patent: Sep. 3, 2013

(54) VIBRATION WAVE DRIVING APPARATUS AND MANUFACTURING METHOD OF VIBRATION BODY

(75) Inventor: Yasuyuki Araki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/432,175

(22) Filed: Mar. 28, 2012

(65) Prior Publication Data

US 2012/0274180 A1     Nov. 1, 2012

(30) Foreign Application Priority Data

Apr. 26, 2011   (JP) ................................. 2011-098231

(51) Int. Cl.
*H01L 41/08* (2006.01)
(52) U.S. Cl.
USPC ................ 310/323.03; 29/25.35; 310/323.02; 310/323.08
(58) Field of Classification Search
USPC ............. 310/323.02, 323.03, 323.08, 323.09, 310/32; 29/25.35
See application file for complete search history.

(56) References Cited

U.S. PATENT DOCUMENTS

| | | | | |
|---|---|---|---|---|
| 6,150,749 A | * | 11/2000 | Tamai et al. | ............. 310/323.12 |
| 7,952,258 B2 | | 5/2011 | Mori | |
| 2011/0227453 A1 | * | 9/2011 | Araki et al. | ............. 310/323.02 |
| 2011/0278987 A1 | | 11/2011 | Oda et al. | |

FOREIGN PATENT DOCUMENTS

| JP | 2004-304887 A | 10/2004 |
|---|---|---|
| JP | 2008-125147 A | 5/2008 |

* cited by examiner

*Primary Examiner* — Mark Budd
(74) *Attorney, Agent, or Firm* — Fitzpatrick, Cella, Harper & Scinto (57) ABSTRACT

A vibration wave driving apparatus according to the present invention includes a vibrator having at least a vibration body formed with a projecting portion having spring characteristics and an electro-mechanical energy conversion element, the vibration wave driving apparatus using motion of the projecting portion to drive a driven body in contact with the projecting portion, wherein the vibration body includes a base portion and the projecting portion, the projecting portion includes two wall portions formed in parallel to a direction orthogonal to a drive direction of the driven body extending in an out-of-plane direction with respect to the base portion and two wall portions formed in parallel to the drive direction of the driven body extending in an out-of-plane direction with respect to the base portion and a contact portion including a contact surface with the driven body formed by connecting the wall portions.

5 Claims, 8 Drawing Sheets

VIBRATION WAVE DRIVING APPARATUS AND MANUFACTURING METHOD OF VIBRATION BODY

BACKGROUND OF THE INVENTION

1. Field of the Invention

The present invention relates to a vibration wave driving apparatus and a manufacturing method of a vibration body therefor, and more particularly, to a vibration body serving as a constituent part of a linear ultrasonic motor and a manufacturing method of the vibration body.

2. Description of the Related Art

In the past, a vibration wave driving apparatus (linear ultrasonic motor) as described in Japanese Patent Application Laid-Open No. 2004-304887 has been suggested as a linear ultrasonic motor for linearly driving the driven body. Principle of driving such linear ultrasonic motor will be described with reference to FIGS. 7A to 7C. As shown in an external perspective view illustrating a linear ultrasonic motor in FIG. 7A, a linear ultrasonic motor 510 includes a vibrator 501, a slider 506, and a pressing member (not illustrated) for pressing the vibrator against the slider. The vibrator 501 includes an electro-mechanical energy conversion element 505, which is typically a piezoelectric element, and a vibration body that is bonded to one side of the electro-mechanical energy conversion element 505 so as to be integrated with the electro-mechanical energy conversion element 505. The vibration body includes a base portion 502, which is formed in a rectangular shape, and two projecting portions 503 and 504, which protrude from the upper surface of the base portion.

In an ultrasonic motor, a voltage having a specific frequency is applied to a piezoelectric element so as to excite a plurality of desired vibration modes, and these vibration modes are superimposed, thereby causing a driving vibration. In the case of the motor illustrated in FIG. 7A, two bending vibration modes are excited in the vibrator 501 illustrated in FIGS. 7B and 7C. Each of the two bending vibration modes is a bending vibration mode in an out-of-plane direction of the vibrator 501, which has a plate-like shape. One of the vibration modes is a second-order bending vibration mode (Mode-A) in the longitudinal direction of the vibrator 501, and the other of the vibration modes is a first-order bending vibration mode (Mode-B) in the width direction of the vibrator 501. The shape of the vibrator 501 is designed so that the resonant frequencies of the two vibration modes are the same or close to each other. The projecting portions 503 and 504 are each disposed in the vicinity of a node of the vibration in Mode-A. Due to the vibration in Mode-A, end surfaces 503-1 and 504-1 of the projecting portions each perform a pendulum motion around a pivot, which is a node of the vibration, and thereby perform a reciprocating motion in the X direction. The projecting portions 503 and 504 are each disposed in the vicinity of an antinode of the vibration in Mode-B. Due to the vibration in Mode-B, end surfaces 503-1 and 504-1 of the projecting portions each perform a reciprocating motion in the Z direction.

Figure 7A:
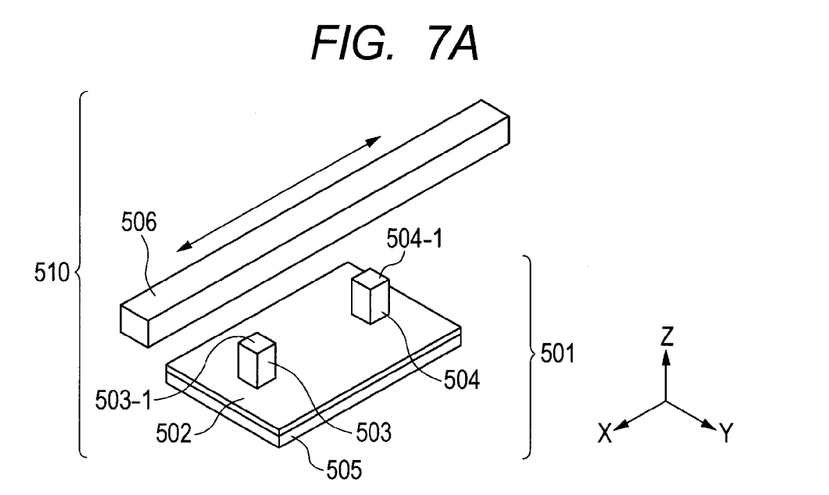
FIG. 7A is an external perspective view illustrating a linear ultrasonic motor described in Japanese Patent Application Laid-Open No. 2004-304887, which is a conventional example.
Figure 7B:
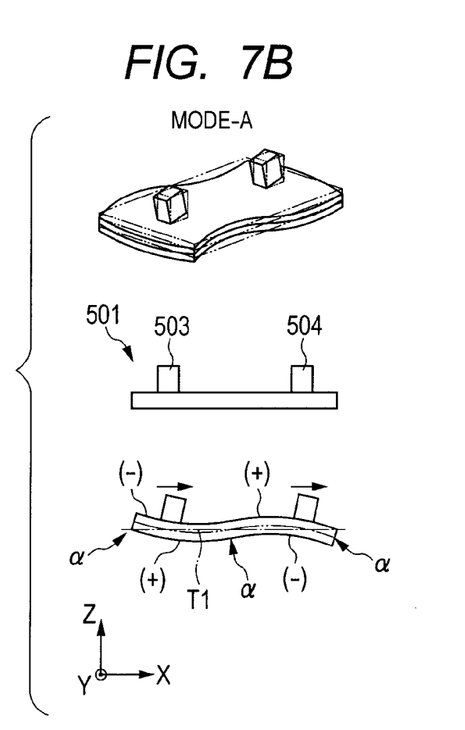
FIG. 7B is a figure illustrating a vibration mode excited in the vibrator of the linear ultrasonic motor as illustrated in FIG. 7A.
Figure 7C:
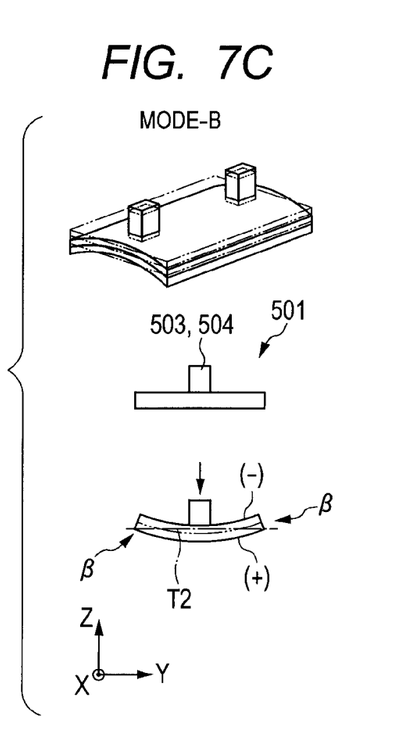
FIG. 7C is a figure illustrating a vibration mode excited in the vibrator of the linear ultrasonic motor as illustrated in FIG. 7A.

The vibrations in the two vibration modes (Mode-A and Mode-B) are excited simultaneously so that the phase difference between the two vibration modes is about ±π/2, and superimposed, whereby the end surfaces 503-1 and 504-1 of the projecting portions each perform an elliptical motion in the XZ plane. Due to the elliptical motions, the slider 506, which is in pressed into contact, can be driven in one direction. At this time, the projecting portions 503 and 504 of the vibrator 501 and the slider 506 intermittently come into contact with each other with the drive frequency of the vibrator 501 (which is several tens of kHz or higher). Therefore, appropriate contact is not achieved unless either of them have appropriate spring characteristics. The projecting portions 503 and 504 also function to amplify the vibration in the X direction as described above.

Figure 8A:
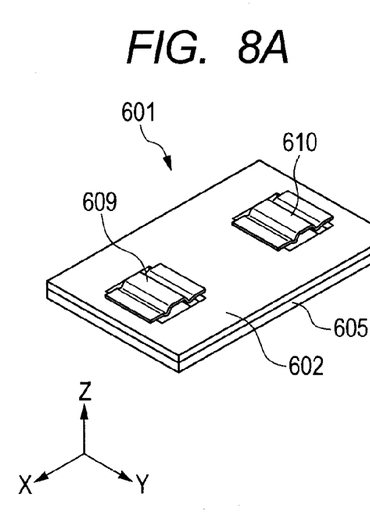
FIG. 8A is an external perspective view illustrating a vibrator of a linear ultrasonic motor described in Japanese Patent Application Laid-Open No. 2008-125147, which is a conventional example.
Figure 8B:
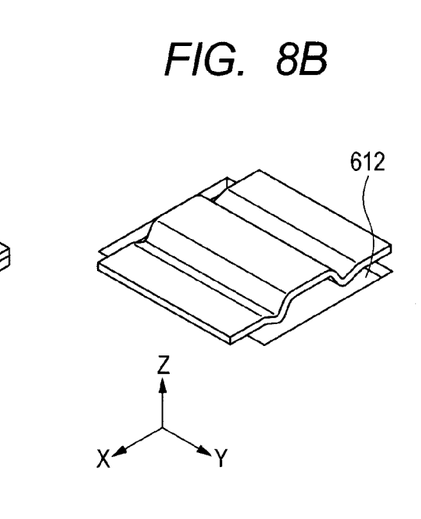
FIG. 8B is an enlarged figure illustrating projecting portions of the linear ultrasonic motor as illustrated in FIG. 8A.
Figure 8C:
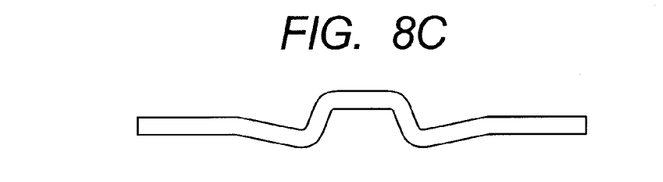
FIG. 8C is a cross sectional view illustrating the projecting portions of the linear ultrasonic motor as illustrated in FIG. 8A.

For the above reason, in order to fulfill these two functions, low-noise driving is realized by giving spring characteristics to the slider side when the configuration of the vibrator described in Japanese Patent Application Laid-Open No. 2004-304887 is made although this is not shown in Japanese Patent Application Laid-Open No. 2004-304887. On the other hand, Japanese Patent Application Laid-Open No. 2008-125147 suggests a vibration actuator in which spring characteristics are given to the projecting portions 503 and 504 and the projecting portions 503 and 504 are made into appropriate shapes as illustrated in FIGS. 8A to 8C, so that low-noise driving is realized.

SUMMARY OF THE INVENTION

However, in a configuration of a vibration actuator described in Japanese Patent Application Laid-Open No. 2008-125147, there is a limitation in increasing the speed of the motor as described below. One of methods for expanding a vibration amplitude in a feeding direction (X direction) includes increasing the height of a projecting portion. However, when the height of the projecting portion in the vibrator 601 described in Japanese Patent Application Laid-Open No. 2008-125147 is increased, the stiffness of the projecting portion in the feeding direction is reduced, and the driving efficiency is reduced, and moreover, in the vibration mode for push-up motion, i.e., the mode-B, satisfaction cannot be necessarily obtained when the vibration angle of the end of the projecting portion is made into a desired value. As a result, unnecessary amplitude in the Z direction is generated, which makes the contact with the slider unstable. On the other hand, the vibrator described in Japanese Patent Application Laid-Open No. 2004-304887 can achieve high speed when the height of the protruding portion is increased, but there is a problem in the cost of manufacturing. In view of the above issues, an object of the present invention is to provide a vibration wave driving apparatus that can be manufactured at a low cost and that can increase the speed, and provide a manufacturing method of a vibration body.

A vibration wave driving apparatus according to the present invention includes a vibrator having at least a vibration body formed with a projecting portion having spring characteristics and an electro-mechanical energy conversion element, and the vibration wave driving apparatus uses motion of the projecting portion to drive a driven body in contact with the projecting portion, wherein the vibration body includes a base portion and the projecting portion, the projecting portion includes two wall portions formed in parallel to a direction orthogonal to a drive direction of the driven body extending in an out-of-plane direction with respect to the base portion and two wall portions formed in parallel to the drive direction of the driven body extending in an out-of-plane direction with respect to the base portion and a contact portion including a contact surface with the driven body formed by connecting the wall portions. A manufacturing method of a vibration body according to the present invention for a vibration wave driving apparatus includes a vibrator having at least a vibration body formed with a projecting portion having spring characteristics and an electro-mechanical energy conversion element, and the vibration wave driving apparatus uses elliptical motion of the vibrator to drive a driven body in contact with the projecting portion, the manufacturing method includes preparing a member for integrally forming the projecting portion and the vibration body, and forming a plurality of slits or notches in a region of the member and forming, in a portion sandwiched by the slit or the notch, the projecting portion having two wall portions formed in parallel to a direction orthogonal to the drive direction and two wall portions formed in parallel to the drive direction, using bending processing or drawing.

The present invention can achieve a vibration wave driving apparatus that can be manufactured at a low cost and that can increase the speed, and achieve a manufacturing method of a vibration body therefor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
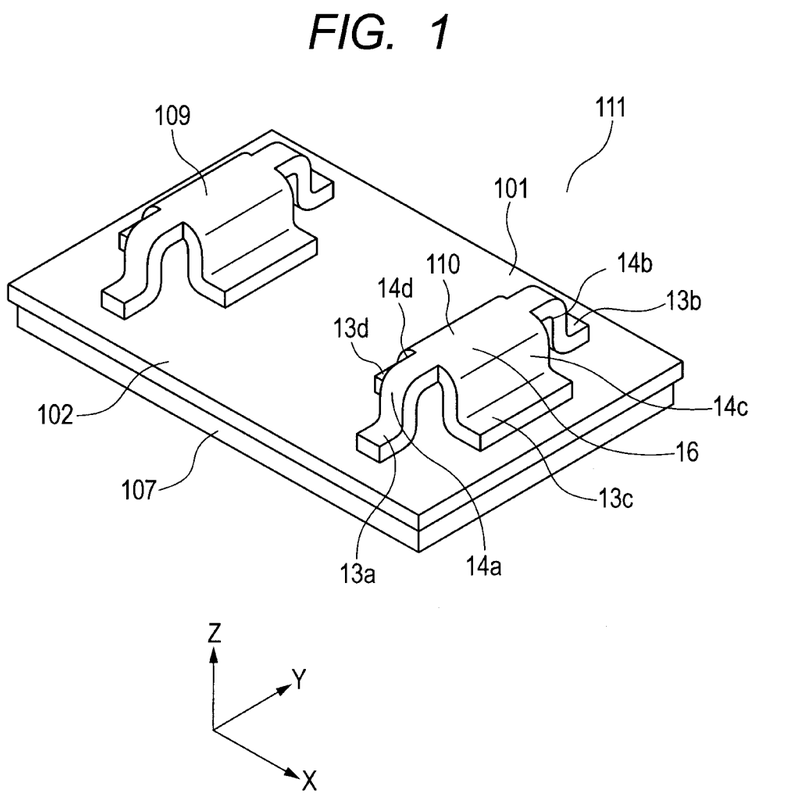
FIG. 1 is a perspective view illustrating a linear ultrasonic motor according to a first embodiment of the present invention.

A configuration of a vibration wave driving apparatus according to the present invention will be described as a first embodiment. The vibration wave driving apparatus according to the present embodiment includes a vibrator having at least a vibration body formed with projecting portions having spring characteristics and an electro-mechanical energy conversion element, and is configured such that a driven body brought into contact with the projecting portions is driven by elliptical motion of the vibrator. More specifically, as illustrated in FIG. 1, a vibrator 111 according to the present embodiment includes a piezoelectric element 107 formed in a rectangular thin plate shape and a vibration body 101 that is bonded to one end surface of the piezoelectric element 107 so as to be integrated with the piezoelectric element 107. The vibration body 101 is provided with two projecting portions 109, 110 in contact with a slider (not illustrated), and the slider and the vibration body 101 are in pressurized contact with each other via the projecting portions 109, 110. When an alternating voltage is applied to the piezoelectric element 107, two bending vibration modes are excited in the vibrator 111, and elliptical motion is excited on contact surfaces of the projecting portions 109, 110. As a result, the slider in pressurized contact with the projecting portions 109, 110 receives frictional driving force, and is driven in the X direction (feeding direction).

Now, the configuration of the vibration body will be described. The vibration body is formed with a base portion and a projecting portion. Further, the projecting portion includes two wall portions formed in parallel to a direction orthogonal to a drive direction of the driven body extending in an out-of-plane direction with respect to the base portion and two wall portions formed in parallel to the drive direction of the driven body extending in an out-of-plane direction with respect to the base portion. In addition, a contact portion having a contact surface with the driven body is provided, wherein the contact portion is formed by connecting these wall portions. More specifically, the vibration body 101 includes the base portion 102 and the projecting portions 109, 110. Like FIG. 7B illustrated in the conventional art, these projecting portions 109, 110 are formed in proximity to a node of a second-order bending mode (feeding mode). The projecting portions 109, 110 include four wall portions 14a, 14b, 14c, 14d, a contact portion 16, and fixing portions 13a, 13b, 13c, 13d. A surface of the contact portion 16 is formed with a contact surface brought into pressurized contact with the slider. The wall portions 14a, 14b are within the same ZY plane. In other words, the projecting portions 109, 110 have two fixing bases in parallel to a direction (Y direction) orthogonal to the feeding direction (X direction). The higher position the contact portion 16 is formed, the more greatly the stiffness is reduced in the X direction, and which makes it impossible to sufficiently transmit the driving force. Accordingly, the widths of the wall portions 14a, 14b in the X direction are determined so that the stiffness in the X direction is increased and therefore the amount of deformation with respect to thrust force generated by the vibrator is sufficiently smaller than the vibration amplitude.

The wall portions 14c, 14d are formed in a direction orthogonal to the wall portions 14a, 14b. FIG. 6B is a result of FEM analysis which is carried out when a vibration body and a piezoelectric element are attached with each other where the wall portions 14c, 14d are omitted from the present embodiment. When the vibration mode for push-up motion (Mode-B as illustrated in FIG. 7C) is excited with only the wall portions 14a, 14b, the contact portion 16 is displaced in a direction opposite to the displacement direction in the Z direction of the piezoelectric element under the contact portion 16, and this cannot achieve stable driving.

Figure 6A:
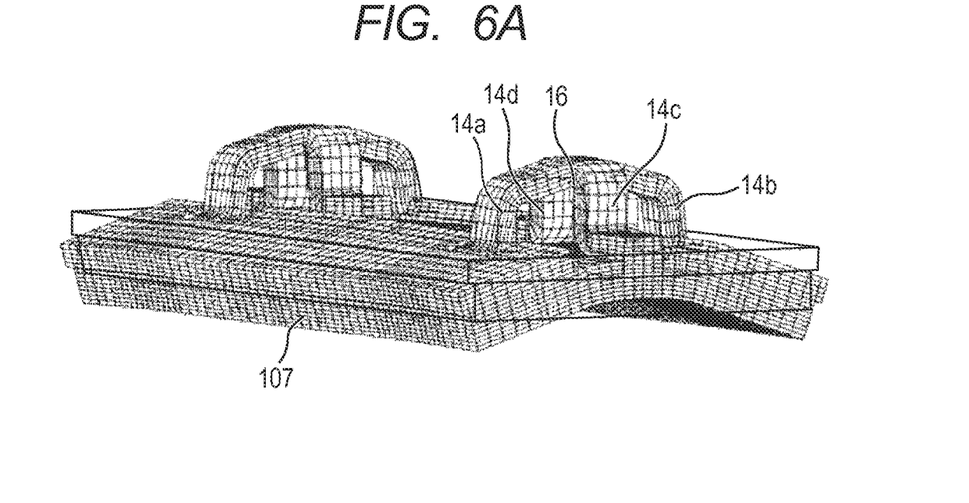
FIG. 6A is a figure illustrating a vibration mode for push-up motion of the vibration body according to the first embodiment of the present invention.
Figure 6B:
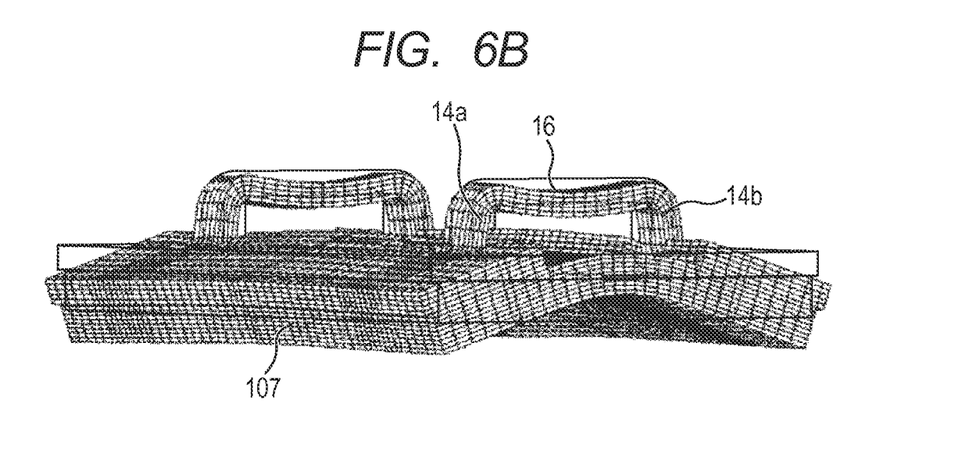
FIG. 6B is a figure illustrating a vibration mode for push-up motion of the vibration body according to the first embodiment of the present invention where phases of a protruding contact portion and a piezoelectric element under the protruding contact portion are opposite.

FIG. 6A is a figure illustrating the vibration mode for push-up motion obtained as a result of carrying out FEM analysis when the vibration body 101 and the piezoelectric element 107 are attached with each other according to the present embodiment. In this case, the wall portions 14c, 14d are provided to support the contact portion 16, and therefore, when the vibration mode for push-up motion is excited, the contact portion 16 is displaced in the same direction as the displacement direction in the Z direction of the piezoelectric element 107 under the contact portion 16, and this achieves stable driving. When the wall portions 14c, 14d are provided, the stiffness can also be increased in the X direction, and the driving force can be transmitted sufficiently.

While the configuration as illustrated in FIG. 1 is maintained, spring characteristics are given to the slider, so that preferable contact state can be achieved between the vibrator 111 and the slider. Even when the height of the projecting portions 109, 110 is increased to increase the speed, the driving force of the vibrator 111 can be transmitted efficiently to the slider because the stiffness of the projecting portions 109, 110 in the X direction, i.e., the drive direction of the slider, is ensured by the wall portions 14a, 14b. As compared with a vibration body 501 provided with rigid projecting portions 503-1, 504-1 as illustrated in FIG. 7A, the vibration body 101 according to the present embodiment is configured to have such a structure in which the projecting portions 109, 110 have spring characteristics. Furthermore, the projecting portions 109, 110 are configured to have such a structure that a space is provided between the base portion 102 and the contact portion 16 including the respective wall portions described above. In general, the thinner the plate thickness of the vibration body 101 is, the smaller the bending stiffness becomes. When the present embodiment is employed, the bending stiffness in the vibration mode for push-up motion is reduced, and as a result, electric power efficiency can be enhanced.

Subsequently, an example of manufacturing method of the vibration body 101 in the vibration wave driving apparatus according to the present embodiment will be hereinafter described. In the present embodiment, the vibration body is made of a stainless steel material, and in particular, the vibration body is made of SUS420J2 or SUS440C, which are wear-resistant. The projecting portions 109, 110 are formed as separate bodies by, for example, press work from a plate material. A flat plate is used as the base portion 102. After the projecting portions 109, 110 are positioned with respect to the base portion 102, the fixing portions 13a, 13b, 13c, 13d of the projecting portions 109, 110 and the base portion 102 which are in contact with each other are bonded by laser welding or adhesive, whereby the vibration body 101 is made. According to the configuration of the present embodiment described above, the projecting portion has two wall portions in a parallel direction to the feeding direction, and has two wall portions in a direction orthogonal to the feeding direction, so that even when the height of the projecting portions is increased, the contact portion of the projecting portion can be displaced in the same direction as the piezoelectric element during the vibration mode for push-up motion. Therefore, stable contact with the slider can be achieved, and the speed of the motor can be increased.

Second Embodiment

An example of configuration of second embodiment according to the present invention will be described with reference to FIG. 2. A vibration body 201 is provided with two projecting portions 209, 210 in contact with a slider (not illustrated), and the slider and the vibration body 201 are in pressurized contact with each other via the projecting portions 209, 210. The piezoelectric element (not illustrated) is bonded to a surface opposite to the projecting portions 209, 210 of the vibration body 201 like the first embodiment. When an alternating voltage is applied to the piezoelectric element, two bending vibration modes are excited in the vibrator, and elliptical motion is excited on contact surfaces of the projecting portions 209, 210. As a result, the slider in pressurized contact with the projecting portions 209, 210 receives frictional driving force, and is driven in the X direction (feeding direction).

In the present embodiment, through holes are arranged in some portions of the base portion which are sandwiched between the projecting portions and the electro-mechanical energy conversion element. Further, the vibration body 201 includes the flat plate-like base portion 202 provided with the through holes 21 and the projecting portions 209, 210. Like FIG. 7B illustrated in the conventional art, these projecting portions 209, 210 are formed in proximity to a node of a second-order bending mode (feeding mode). In this case, the projecting portions 209, 210 include four wall portions 24a, 24b, 24c, 24d and a contact portion 26. A surface of the contact portion 26 is formed with a contact surface brought into pressurized contact with the slider. The wall portions 24a, 24b are within the same ZY plane. In other words, the projecting portions 209, 210 have two fixing bases in parallel to a direction (Y direction) orthogonal to the feeding direction (X direction). Like the first embodiment, in the present embodiment, the widths of the wall portions 24a, 24b in the X direction are determined so that the stiffness in the X direction is increased and therefore the amount of deformation with respect to thrust force generated by the vibrator is sufficiently smaller than the vibration amplitude.

The wall portions 24c, 24d are formed in a direction orthogonal to the wall portions 24a, 24b. Like the first embodiment, when the vibration mode for push-up motion is excited with only the wall portions 24a, 24b, the contact portion 26 is displaced in a direction opposite to the displacement direction in the Z direction of the piezoelectric element under the contact portion 26, and this cannot achieve stable driving. The wall portions 24c, 24d are provided to support the contact portion 26, and therefore, when the vibration mode for push-up motion is excited, the contact portion 26 is displaced in the same direction as the displacement direction in the Z direction of the piezoelectric element under the contact portion 26, and this achieves stable driving. When the wall portions 24c, 24d are provided, the stiffness can also be increased in the X direction, and the driving force can be transmitted sufficiently.

Figure 2:
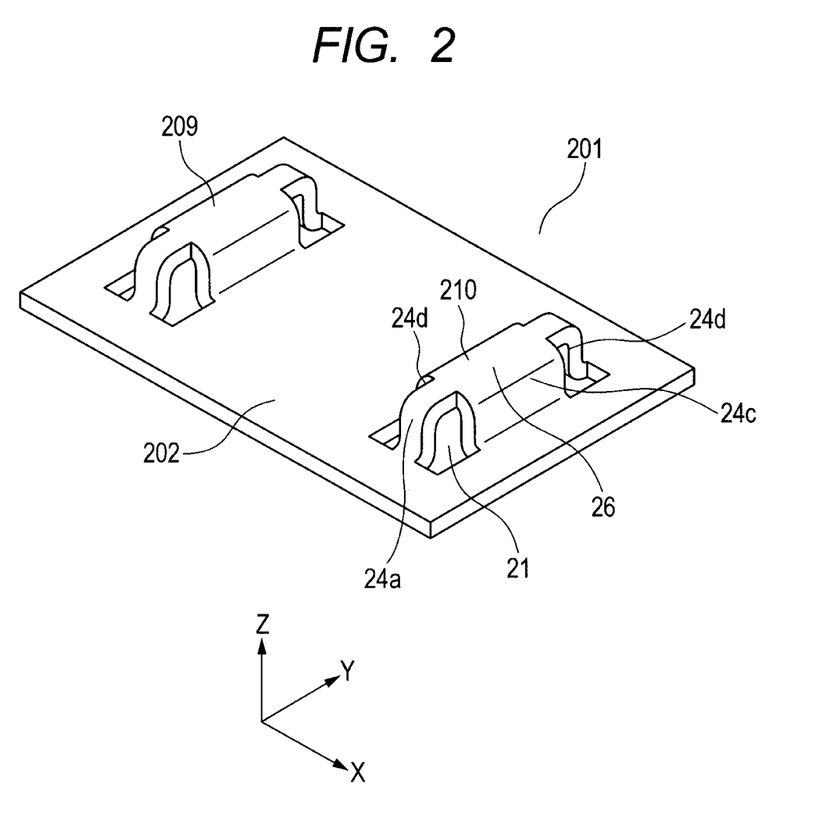
FIG. 2 is a figure illustrating a vibration body according to a second embodiment of the present invention.

While the configuration as illustrated in FIG. 2 is maintained, spring characteristics are given to the slider, so that preferable contact state can be achieved between the vibrator and the slider. As compared with the vibration body 501 provided with the rigid projecting portions 503-1, 504-1 as illustrated in FIG. 7A, the vibration body 201 according to the present embodiment is configured to have such a structure in which the projecting portions 209, 210 have spring characteristics. Furthermore, the projecting portions 209, 210 are configured to have such a structure that a space is provided between the piezoelectric element and the contact portion 26 including the respective wall portions described above. In general, the thinner the plate thickness of the vibration body is, the smaller the bending stiffness becomes. When the present embodiment is employed, the bending stiffness in the vibration mode for push-up motion is reduced, and as a result, electric power efficiency can be enhanced.

Subsequently, an example of manufacturing method of the vibration body 201 in the vibration wave driving apparatus according to the present embodiment will be hereinafter described. In the present embodiment, the vibration body is made of a stainless steel material, and in particular, the vibration body is made of SUS420J2 or SUS440C, which are wear-resistant. In general, the projecting portions 209, 210 and the base portion 202 are integrally formed from a flat plate member. The projecting portions 209, 210 are made of a flat plate by drawing.

Third Embodiment

An example of configuration of a third embodiment according to the present invention will be described with reference to FIGS. 3A-3B, 4A-4B. The vibration body 301 is provided with two projecting portions 309, 310 in contact with a slider (not illustrated), and the slider and the vibration body 301 are in pressurized contact with each other via the projecting portions 309, 310. The piezoelectric element (not illustrated) is bonded to a surface opposite to the projecting portions 309, 310 of the vibration body 301 like the first embodiment. When an alternating voltage is applied to the piezoelectric element, two bending vibration modes are excited in the vibrator, and elliptical motion is excited on contact surfaces of the projecting portions 309, 310. As a result, the slider in pressurized contact with the projecting portions 309, 310 receives frictional driving force, and is driven in the X direction (feeding direction). The vibration body 301 includes projecting portions 309, 310 and a flat plate-like base portion 302 divided into a plurality of parts. More specifically, a through hole 31 is provided under the contact portion 36 of the vibration body 301, and a plurality of notch portions 32 are provided so that the base portion 302 is divided into a plurality of parts when the projecting portions 309, 310 are removed. End portions of the base portion in parallel to the X direction are separated by the notch portions 32, but there is no notch portion at end portions of the base portion in parallel to the Y direction. Like FIG. 7B illustrated in the conventional art, these projecting portions 309, 310 are formed in proximity to a node of a second-order bending mode (feeding mode). The projecting portions 309, 310 include four wall portions 34a, 34b, 34c, 34d and a contact portion 36. A surface of the contact portion 36 is formed with a contact surface brought into pressurized contact with the slider.

The wall portions 34a, 34b are within the same ZY plane. In other words, the projecting portions 309, 310 have two fixing bases in parallel to a direction (Y direction) orthogonal to the feeding direction (X direction). Like the first embodiment, in the present embodiment, the widths of the wall portions 34a, 34b in the X direction are determined so that the stiffness in the X direction is increased and therefore the amount of deformation with respect to thrust force generated by the vibrator is sufficiently smaller than the vibration amplitude. The wall portions 34c, 34d are formed in a direction orthogonal to the wall portions 34a, 34b. Like the first embodiment, when the vibration mode for push-up motion is excited with only the wall portions 34a, 34b, the contact portion 36 is displaced in a direction opposite to the displacement direction in the Z direction of the piezoelectric element under the contact portion 36, and this cannot achieve stable driving. The wall portions 34c, 34d are provided to support the contact portion 36, and therefore, when the vibration mode for push-up motion is excited, the contact portion 36 is displaced in the same direction as the displacement direction in the Z direction of the piezoelectric element under the contact portion 36, and this achieves stable driving. By providing the wall portions 34c, 34d, the stiffness can also be increased in the X direction, and the driving force can be transmitted sufficiently.

As compared with the vibration body 501 provided with the rigid projecting portions 503-1, 504-1 as illustrated in FIG. 7A, the vibration body 301 according to the present embodiment is configured to have such a structure in which the projecting portions 309, 310 have spring characteristics. Furthermore, the projecting portions 309, 310 are configured to have such a structure that a space is provided between the piezoelectric element and the contact portion 36 including the respective wall portions described above. In general, the thinner the plate thickness of the vibration body is, the smaller the bending stiffness becomes. When the present embodiment is employed, the bending stiffness in the vibration mode for push-up motion is reduced, and as a result, electric power efficiency can be enhanced. While the configuration as illustrated in FIG. 2 is maintained, spring characteristics are given to the slider, so that preferable contact state can be achieved between the vibrator and the slider.

Figure 3A:
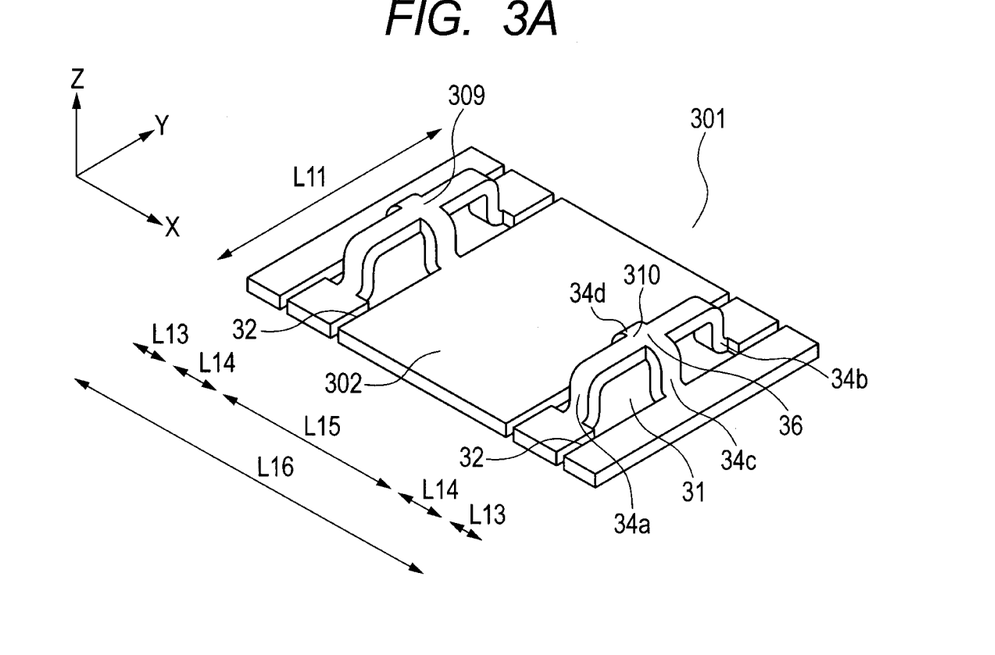
FIG. 3A is a figure illustrating a vibration body according to a third embodiment of the present invention.
Figure 3B:
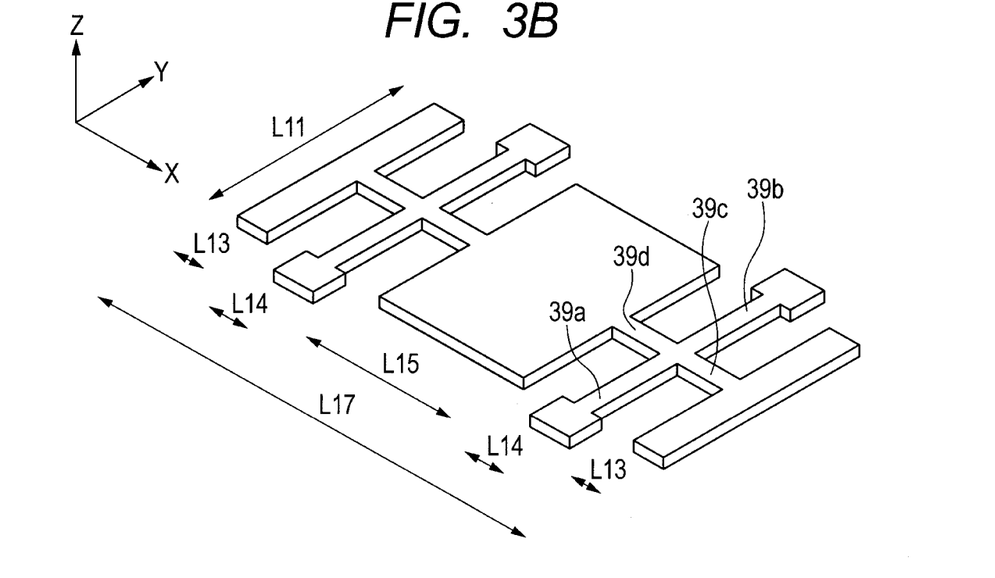
FIG. 3B is a figure illustrating a vibration body according to the third embodiment of the present invention before projecting portions are formed.

Subsequently, an example of a manufacturing method of the vibration body 301 as illustrated in FIG. 3A in the vibration wave driving apparatus according to the present embodiment will be hereinafter described. In the present embodiment, the vibration body is made of a stainless steel material, and in particular, the vibration body is made of SUS420J2 or SUS440C, which are wear-resistant. A flat plate having a size larger than the entire length of the vibration body 301 to be manufactured is prepared, and as illustrated in FIG. 3B, notch portions and slits are provided, so that the base portions adjacent to the respective wall portions of the same projecting portion are not in contact with each other. The notch portion is processed by etching or punching through press working, and thereafter, projecting bending portions 39a, 39b, 39c, 39d are processed by bending work, so that the projecting portions 309, 310 are integrally formed from a flat plate. The processed shape is as illustrated in FIG. 3A, and a portion of the notch portion is made into a slit having a narrow width. As described above, portions of the base portion sandwiched by the slits or notches are bent and processed, so that they are formed into the projecting portions 309, 310. Therefore, this achieves processing substantially without changing the plate thickness of the projecting portions 309, 310 before and after the processing. As a result, unlike, for example, drawing and molding requiring a plate with a high elongation rate, this reduces limitation on the height and the shape of the projecting portions 309, 310 that can be manufactured. As compared with the drawing, the wall portions 34a, 34b, 34c, 34d can be formed with a high degree of stiffness while the plate thickness of the projecting portions does not decrease greatly. When the supporting portion is integrally formed with the vibration body to support the vibrator, the supporting portion is provided in proximity to the node of vibration in order not to suppress the vibration of the vibration body. As shown in the figures illustrating the modes in FIGS. 7B and 7C according to the conventional example, in the feeding mode, three nodes of vibration exist at respective end portions in parallel to the XZ plane of the vibration body, and in the vibration mode for push-up motion, two nodes of vibration exist at respective end portions in parallel to the YZ plane of the vibration body. The position to which an arm portion of the supporting portion is extended from the vibration body may be a node of vibration in the feeding mode or a node of vibration in the vibration mode for push-up motion. There may be one arm portion or two arm portions which connect the vibration body and the fixing portion of the supporting portion.

Figure 5A:
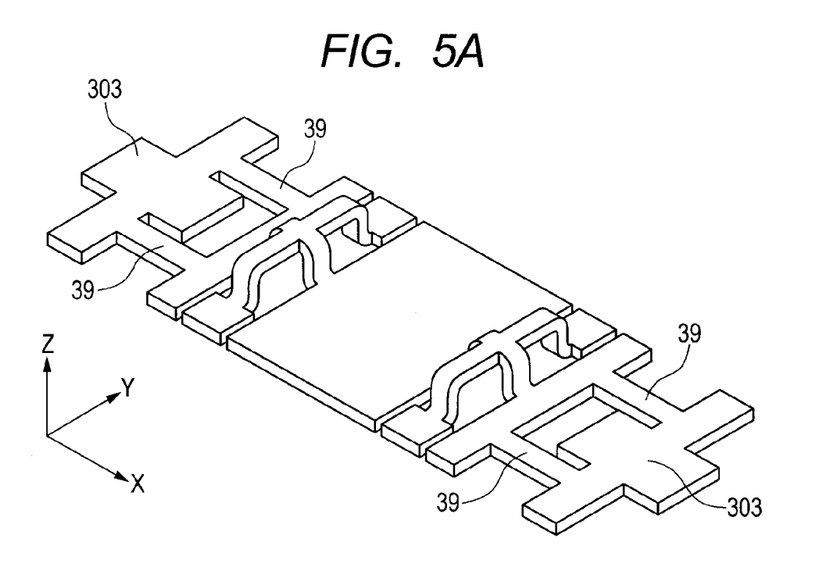
FIG. 5A is a figure illustrating a vibration body having supporting portions according to the third embodiment of the present invention.

In the shape as illustrated in FIG. 3A, when two arm portions 39 of a supporting portion 303 extend from two end portions of the vibration body 301 facing each other, the arm portions 39 of the supporting portion 303 extend as illustrated in FIG. 5A from portions in proximity to the node of vibration in the mode for push-up motion at the end portion of the vibration body 301 in parallel to the YZ plane. Accordingly, the gap between the two arm portions 39 of the supporting portion 303 is maintained before and after the bending processing, and this can prevent a portion of the supporting portion 303 from being bent. At this occasion, with regard to the Y direction, the size of the vibrator can be reduced, and with regard to the Y direction, limitation imposed on the size of the vibrator is reduced. When one arm portion 39 of the supporting portion 303 extends from each end portion of the vibration body 301, the arm portion 39 of the supporting portion 303 can extend from the center of the end portions of the vibration body 301 in parallel to the XZ plane, located in proximity to the node of vibration in the feeding mode. Accordingly, the gap between the two arm portions 39 of the supporting portion 303 is maintained before and after the bending processing, and this can prevent a portion of the supporting portion 303 from being bent. At this occasion, with regard to the X direction, the size of the vibrator can be reduced, and with regard to the X direction, limitation imposed on the size of the vibrator is reduced.

Figure 4A:
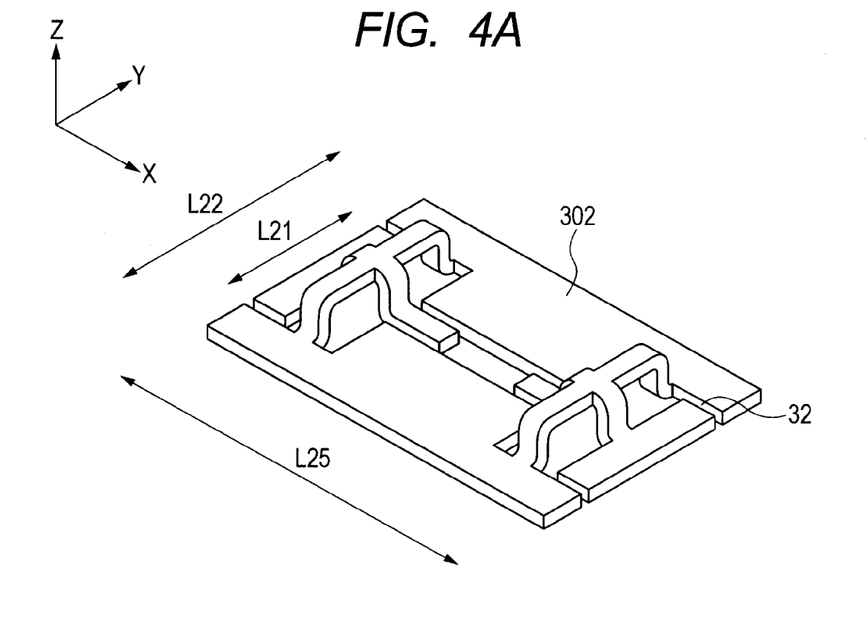
FIG. 4A is a figure illustrating a vibration body according to the third embodiment of the present invention.
Figure 4B:
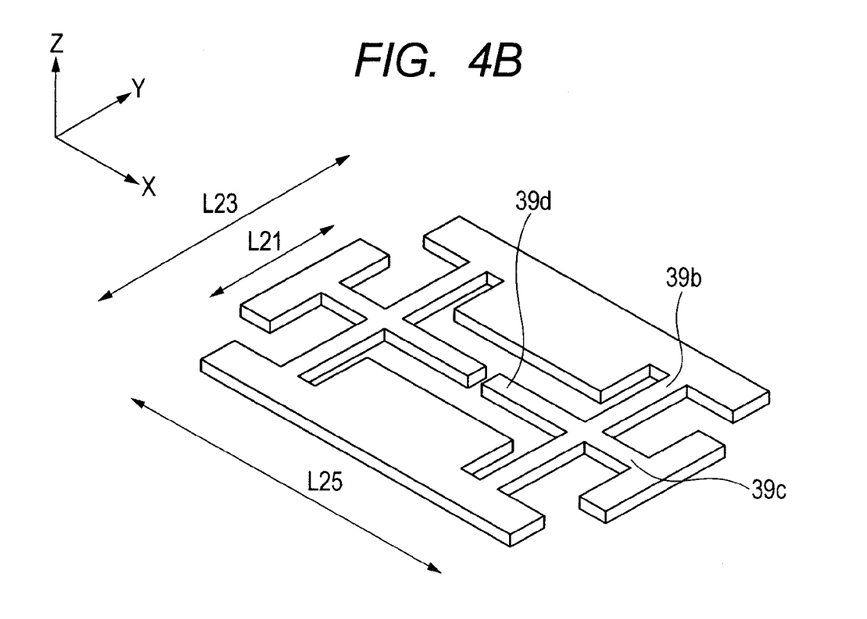
FIG. 4B is a figure illustrating a vibration body according to the third embodiment of the present invention before projecting portions are formed.

Subsequently, another aspect of the present embodiment will be described. The shape of a vibration body as illustrated in FIG. 4A is different from that as illustrated in FIG. 3A of the present embodiment in that positions of a plurality of notch portions 32 provided on the base portion 302 are different, and end portions of the base portion 302 in parallel to the YZ plane are separated by the notch portions 32 but there is no notch portion at the end portions of the base portion 302 in parallel to the XZ plane. The shape of the vibration body as illustrated in FIG. 4A can be processed from the shape as illustrated in FIG. 4B by the same method as described above.

Figure 5B:
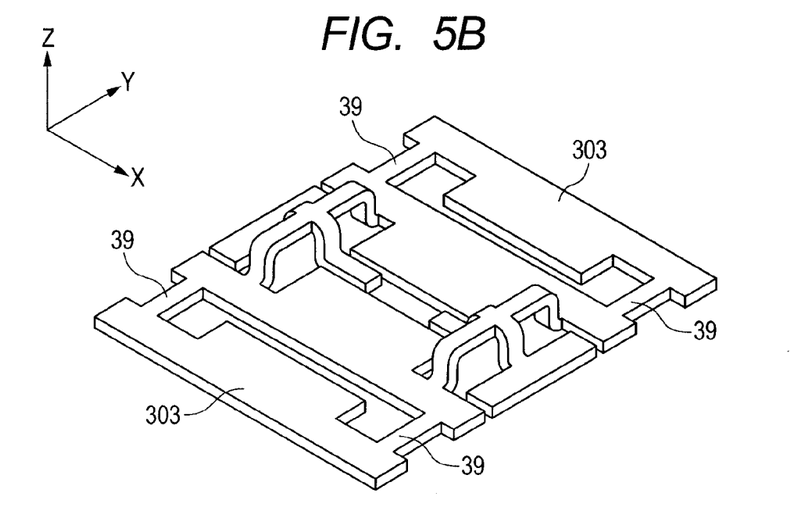
FIG. 5B is a figure illustrating a vibration body having supporting portions according to the third embodiment of the present invention.

In the shape as illustrated in FIG. 4A, when two arm portions 39 of a supporting portion 303 extend from each end portion of the vibration body 301, the arm portions 39 of the supporting portion 303 extend as illustrated in FIG. 5B from portions in proximity to two of the three vibration nodes except the center node in the feeding mode located at the end portions of the vibration body 301 in parallel to the XZ plane. Accordingly, the gap between the two arm portions 39 of the supporting portion 303 is maintained before and after the bending processing, and this can prevent a portion of the supporting portion 303 from being bent. At this occasion, with regard to the X direction, the size of the vibrator can be reduced, and with regard to the X direction, limitation imposed on the size of the vibrator is reduced. When one arm portion 39 of the supporting portion 303 extends from each end portion of the vibration body 301, the arm portion 39 of the supporting portion can extend from the center of the end portions of the vibration body 301 in parallel to the XZ plane, located in proximity to the node of vibration in the feeding mode. At this occasion, with regard to the X direction, the size of the vibrator can be reduced, and with regard to the X direction, limitation imposed on the size of the vibrator is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-098231, filed Apr. 26, 2011, which is hereby incorporated by reference herein in its entirety.

What is claimed is:

1. A vibration wave driving apparatus comprising a vibrator having at least a vibration body formed with a projecting portion having spring characteristics and an electro-mechanical energy conversion element, the vibration wave driving apparatus using motion of the projecting portion to drive a driven body in contact with the projecting portion,
wherein the vibration body includes a base portion and the projecting portion, and
the projecting portion includes:
two wall portions formed in parallel to a direction orthogonal to a drive direction of the driven body extending in an out-of-plane direction with respect to the base portion and two wall portions formed in parallel to the drive direction of the driven body extending in an out-of-plane direction with respect to the base portion, and
a contact portion including a contact surface with the driven body formed by connecting the wall portions.

2. The vibration wave driving apparatus according to claim 1, wherein the projecting portion is configured to be in a structure in which a space is formed between the base portion and the contact portion and within the respective wall portions.

3. The vibration wave driving apparatus according to claim 1, wherein a through-hole is provided in a region of the base portion sandwiched by the projecting portion and the electro-mechanical energy conversion element.

4. The vibration wave driving apparatus according to claim 1, wherein the projecting portion is integrally made of a member constituting the base portion with a plurality of slits or notches, provided in the base portion, interposed between sections of the member, and the sections of the member adjacent to the respective wall portions are configured not to be in contact with each other.

5. A manufacturing method of a vibration body for a vibration wave driving apparatus comprising a vibrator having at least a vibration body formed with a projecting portion having spring characteristics and an electro-mechanical energy conversion element, the vibration wave driving apparatus using elliptical motion of the vibrator to drive a driven body in contact with the projecting portion,
the manufacturing method comprising:
preparing a member for integrally forming the projecting portion and the vibration body, and forming a plurality of slits or notches in a region of the member; and
forming, from sections of the member sandwiched by the slits or the notches, the projecting portion having two wall portions formed in parallel to a direction orthogonal to the drive direction and two wall portions formed in parallel to the drive direction, using bending processing or drawing.

* * * * *